E. H. OBERTOP.
PISTON RING.
APPLICATION FILED MAY 10, 1915.
1,179,333.
Patented Apr. 11, 1916.
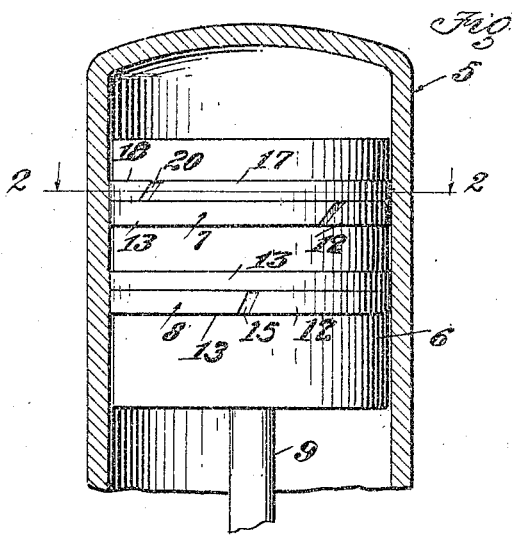
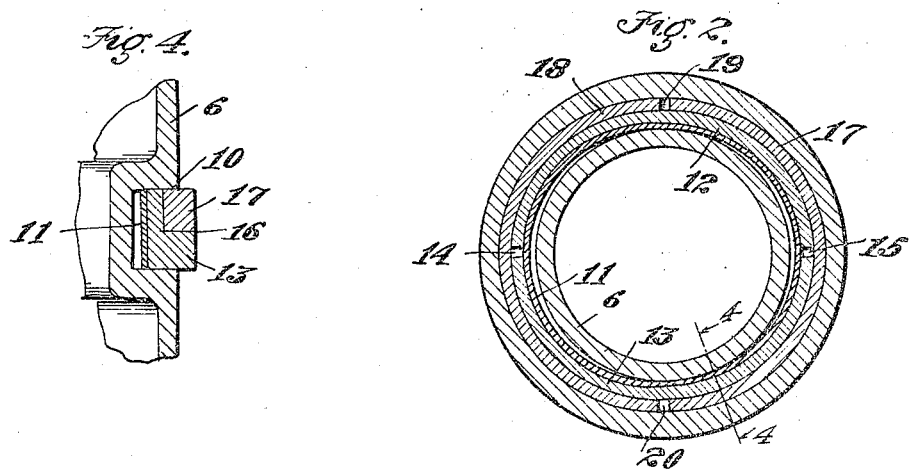
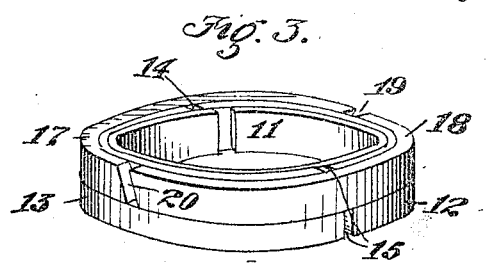
Inventor,
Earl H. Obertop.

UNITED STATES PATENT OFFICE.

EARL H. OBERTOP, OF GOLDFIELD, NEVADA, ASSIGNOR TO ROBERT STERLING, OF GOLDFIELD, NEVADA.

PISTON-RING.

1,179,333.  Specification of Letters Patent.  Patented Apr. 11, 1916.

Application filed May 10, 1915. Serial No. 26,924.

*To all whom it may concern:*

Be it known that I, EARL H. OBERTOP, a citizen of the United States, residing at Goldfield, in the county of Esmeralda and State of Nevada, have invented new and useful Improvements in Piston-Rings, of which the following is a specification.

This invention relates to packing rings for pistons to be used in steam engines, pumps and other machines which are provided with pistons reciprocating in cylinders.

It is an object of this invention to provide an expansible metallic packing ring which will provide a tight fit between the cylinder and ring, thereby preventing leakage.

It is an object of this invention to provide another expansible packing ring which will accommodate itself to a cylinder whose wall is not perfectly circular in cross section.

It is a further object of this invention to provide an expansible metallic packing ring which, due to its construction, is easily put into place without straining the parts as is unavoidable in the case of a one-piece split ring.

I accomplish these objects by means of the embodiment of my invention disclosed in the accompanying drawing, in which:

Figure 1 is a vertical section through a cylinder, showing in elevation a piston equipped with my rings. Fig. 2 is a section on the line 2—2 of Fig. 1, illustrating the ring disposed in a cylinder whose walls are not concentric. Fig. 3 is a perspective view of a ring. Fig. 4 is an enlarged fragmentary vertical section taken on the line 4—4 of Fig. 2.

More specifically, 5 indicates an engine cylinder of the usual construction and of a type common in gas engines, 6 a piston disposed therein provided with packing rings 7 and 8, and the usual piston rod 9. The rings are disposed in peripheral grooves 10 on the surface of the piston. Each ring consists of a flat circular spring member 11 which expands the segmental rings mounted upon it. A rigid segmental ring is disposed upon the spring 11 and consists, as shown, of two halves 12 and 13 with spaces 14 and 15 between the ends of the segments, thereby permitting expansion and contraction of the ring. The rigid ring is rabbeted at a peripheral edge as indicated at 16 and disposed in said rabbet is a resilient segmental ring comprised of two parts 17 and 18 having spaces 19 and 20 between the segments allowing for expansion.

In assembling the ring spaces 19 and 20 are disposed in staggered relation to spaces 14 and 15 thereby providing a construction in which the space in each segmental ring caused by expansion is covered by the other segmental ring overlapping it next to the cylinder wall, thereby preventing all leak or escape of the operating fluid.

It will be noted that the ring can be easily assembled and will be held in its assembled position by virtue of its peculiar structure. The spring ring 11 tends to force the segmental ring portions 12 and 13 outward, while the resilient segmental ring members 17 and 18 tend to hold the ring together.

In expansible rings as now constructed the ring does not conform to the shape of a cylinder which is not perfectly round in section, touching only at one or two points if the section of the cylinder is oval, or has worn unevenly at one or more points. My ring is so constructed that the outside or smaller ring is resilient or elastic enough to expand and accommodate itself to any wear in the cylinder, whether it is worn simply larger and remains perfectly circular in section, or has worn into an irregular shape.

In the manufacture of my ring it is turned to the exact size of the cylinder for which it is to be used, and then cut in two, making it a segmental ring. Leakproof rings heretofore constructed are turned 1/16th to 5/32nds of an inch larger than the cylinder so that they will have spring in them with the result that when cut and fitted to the cylinder, they bear at the points and back only. When a one piece expansible piston ring is forced over the piston it is distorted due to the strain placed upon it and will not thereafter fit the cylinder properly.

What I claim is:

A piston ring, comprising a circular split spring, a ring comprised of two like rigid segments annularly rabbeted at one peripheral edge disposed about said spring, and a ring comprised of two like resilient segments disposed in the rabbet of said rigid ring with the spaces between its segments staggered with respect to the spaces between the segments of said rigid ring.

In witness that I claim the foregoing I have hereunto subscribed my name this 30th day of April, 1915.

EARL H. OBERTOP.